Nov. 30, 1943.　　　　F. SENYAL　　　　2,335,458
FILTER AND WATER PURIFIER
Filed March 29, 1943　　　　2 Sheets-Sheet 1
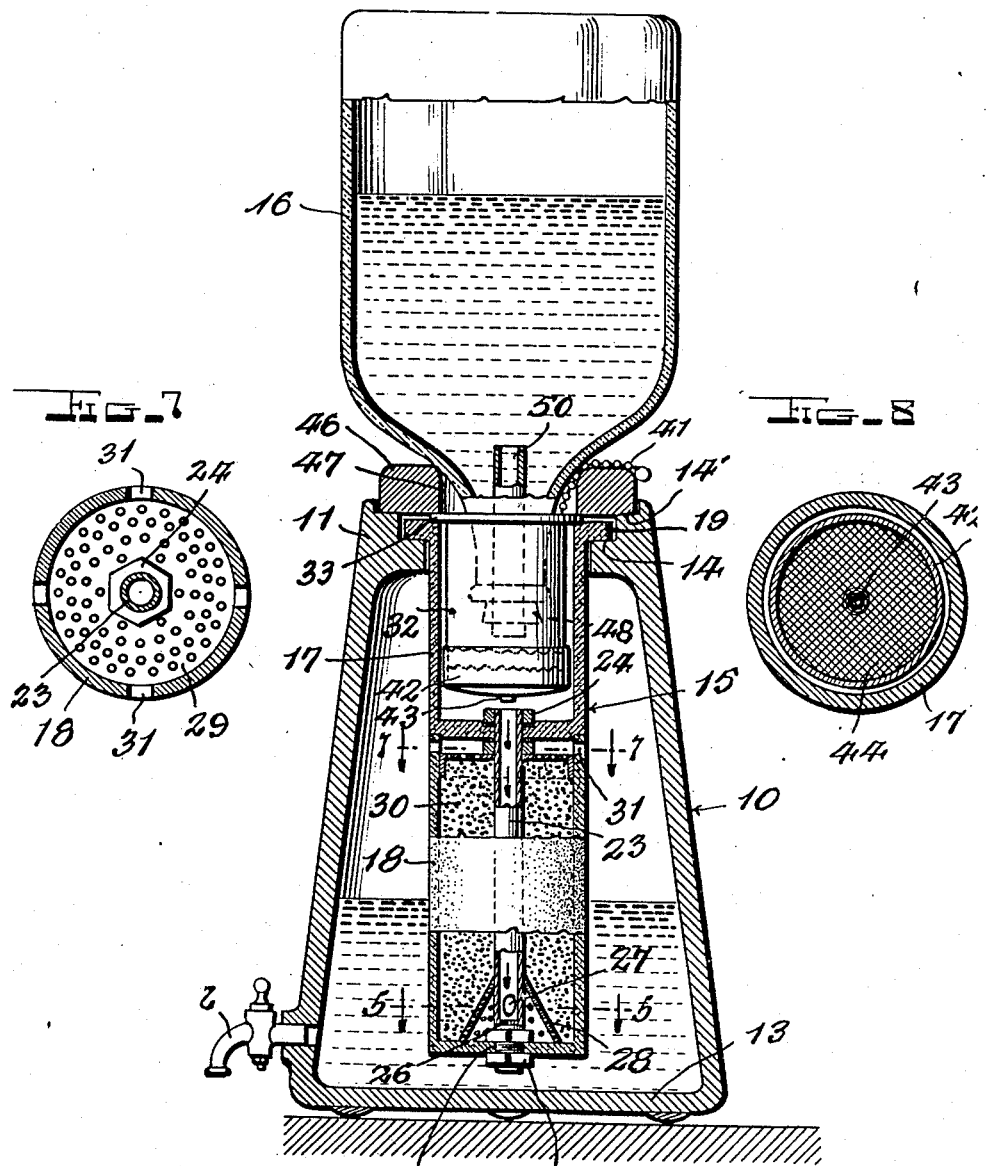
INVENTOR.
F. Senyal,
BY
Christian R. Nielsen
ATTORNEY Nov. 30, 1943.　　　　F. SENYAL　　　　2,335,458
FILTER AND WATER PURIFIER
Filed March 29, 1943　　　2 Sheets-Sheet 2
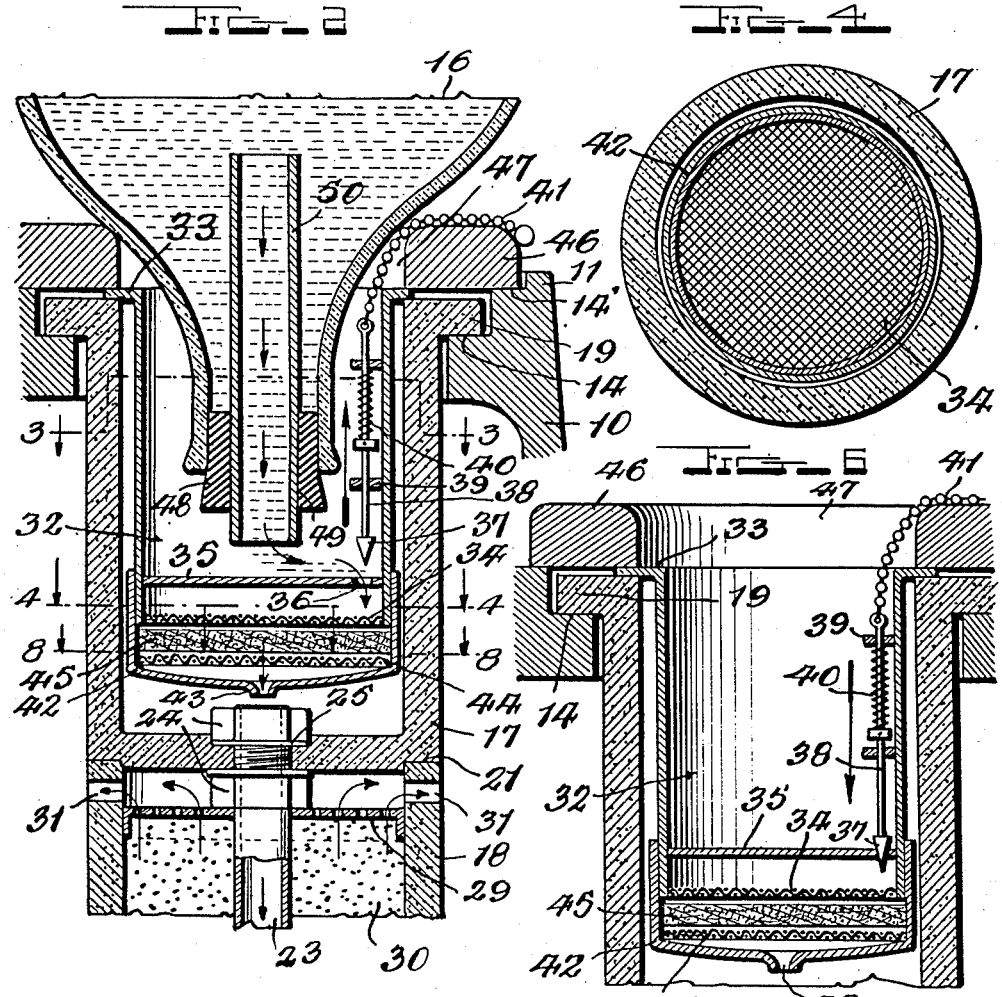
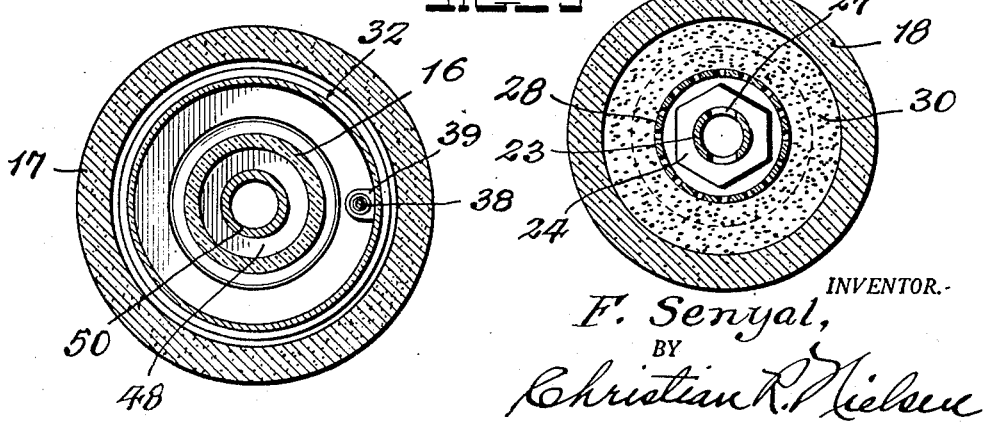
INVENTOR.
F. Senyal,
BY
Christian R. Nielsen
ATTORNEY Patented Nov. 30, 1943

2,335,458

UNITED STATES PATENT OFFICE 2,335,458

FILTER AND WATER PURIFIER

Frank Senyal, New York, N. Y.

Application March 29, 1943, Serial No. 480,984

5 Claims. (Cl. 210—122)

This invention relates to a filter and water purifier and it consists in the constructions, arrangements and combinations herein described and claimed.

It is a particular object of the invention to provide a filter and purifier in which the liquid is caused to have an upward flow through a filtering material in a slow steady manner, thereby insuring intimate contact with the filtering material.

It is also an object of the invention to provide a filter of simple construction and of few parts which may be readily disassembled for the purpose of cleaning and renewal of the filter material.

Additional objects, advantages and features of invention will be apparent from the following description considered in conjunction with the accompanying drawings, wherein Figure 1 is a vertical section, partly in elevation, illustrating the filter and purifier employed in conjunction with a water cooler.

Figure 2 is an enlarged fragmentary vertical section.

Figure 3 is a cross section on the line 3—3 of Figure 2.

Figure 4 is a cross section on the line 4—4 of Figure 2.

Figure 5 is a cross section on the line 5—5 of Figure 1.

Figure 6 is an enlarged cross section of the receiving cup of the filter.

Figure 7 is a cross section on the line 7—7 of Figure 1.

Figure 8 is a cross section on the line 8—8 of Figure 2.

Attention is first invited to Figure 1 of the drawings, wherein there is shown a water cooler or reservoir 10 having an open upper end 11 and a faucet 12 adjacent its base 13. The open end 11 is formed with two concentric recesses 14 and 14' for support of a filter 15 and bottle 16, respectively.

The filter 15 consists of two receptacles 17 and 18 adapted to be connected in nested superposed relation. The receptacle 17 has an outwardly extended flange 19 of a diameter to be received within and rest upon the recess 14 of the reservoir. The base of the receptacle 17 is formed with an axial opening 20 and a circumferential recess 21 adapted to receive the upper edge of the receptacle 18. The base of the receptacle 18 is also formed with an axial opening 22 and through the openings; a tube 23 is extended and secured to retain the receptacles in assembled relation. In the present instance, the tube 23 is shown as threaded at each end for reception of nuts 24, a nut being arranged upon each side of the bases of the receptacles to effect a firm liquid-tight connection between the bases and the tube. If desired, or found necessary, gaskets 25 may be interposed between the bases and the nuts.

The lower end of the tube is closed as indicated at 26 and immediately thereabove an outlet 27 is formed for discharge of liquid into the receptacle 18. Inasmuch as filter material is to be deposited in the receptacle 18, a conical screen 28 is positioned upon the tube 23 and around the outlet 27, thereby preventing the filter material packing in and around the outlet.

A screen 29 is positioned in the receptacle 18 adjacent the top thereof for maintaining the filtering material 30 in the receptacle, and to allow liquid to discharge from the receptacle openings 31 are formed at a point above the screen 29.

A liquid receiver 32 is suspended within the receptacle 17 by means of an overhanging flange 33 which rests upon the upper edge of the receptacle 17. The lower end of the receiver is provided with a screen 34 and spaced inwardly thereof, a bottom wall 35 is secured. An outlet 36 is formed in the bottom wall and in alignment therewith there is a valve 37 for control of liquid through the outlet 36. The valve 37 includes a shank 38 reciprocably mounted in spaced brackets 39. Normally the valve 37 will be held to the outlet by means of a helical spring 40 positioned upon the shank interposed between the upper bracket and a lug on the shank. The upper end of the shank terminates in an eyelet to which a pull chain 41 is secured.

A cap 42 is positioned upon the lower end of the receiver and has an outlet 43 positioned so as to discharge water into the tube 23. The cap is of substantial depth and has mounted therein, adjacent the base, a screen 44. There is thus provided a space between the screen 34 and the screen 44 in which a cotton or other filter 45 is positioned, for absorption of any unprecipitated organic particles which may be present in liquid under treatment.

A bottle-supporting ring 46 rests upon the recess 14' and upon the flange 33 of the receiver, for maintenance of the latter in proper position. The supporting ring is formed with an opening 47 of a diameter the same as that of the receptacle 17 and receives the neck of the bottle 16 therethrough, as well as the pull chain 41. As shown, the bottle rests upon the chain and maintains the valve 37 in adjusted position, as will be explained. The bottle has a stopper 48 provided with a medial opening 49 in which a feed tube 50 is mounted, of a length to project a substantial distance into the bottle as clearly shown in Figures 1 and 2.

In use, a required amount of purifying material, such as chlorine, and a required amount of coagulating material, such as aluminum sulphate, which will vary according to the amount of water to be treated, is placed in the bottle 16. The bottle is then filled with water to be purified and is inverted so as to position the neck of the bottle within the opening 47 of the supporting ring. The valve 37 is in closed position, urged to its seat by the spring 40. After a short period, about fifteen or twenty minutes, the chlorine will have destroyed all bacteria in the water, and any dirt will have precipitated because of the coagulating property of the sulphate of alumina. The feed tube 46 projects well above any precipitated material so that only pure water will have passage through the tube and into the receiver 32. The apparatus may now be put into operation, which is accomplished by slightly tilting the bottle so as to release the chain which is pulled outwardly so as to raise the valve 37, permitting the water to flow from the receiver, through the screen 34, the filter 44, the screen 42, the outlet 43 into the tube 23. From the tube 23 the water passes through the opening 27 through the screen 28.

The water accumulates in the receptacle 13 and gradually rises upwardly through the filter material 30, preferably activated carbon, finally issuing through screen 29 and outwardly through the openings 31 into the reservoir 10. Pure, clean water may now be drawn from the reservoir upon opening the faucet 12.

Water will rise in the reservoir 10 to a level of the lower end of tube 50, and when it is necessary to replenish water in the bottle 16 the latter is simply removed. The valve 37 automatically seats in the outlet 36, by reason of the spring 40.

While I have specifically shown and described my invention, this is by way of illustration only, and I consider as my own, all such modifications in construction as fairly fall within the scope of the appended claims.

I claim:

1. A combined water filter and purifier comprising a reservoir having an open top, a filter member engaged within the open top and suspended within the reservoir, said filter consisting of a pair of receptacles arranged in nested end to end relation, the bottom of the upper receptacle forming a closure for the lower receptacle, a tube member connecting the receptacles, said tube having a closed lower end and lateral discharge ports, filter material in the lower receptacle, a liquid receiver suspended within the upper receptacle having an outlet aligned with said tube member, a bottle support carried by the open top of the reservoir, an inverted bottle disposed within said support, and said lower filter receptacle having discharge ports adjacent the upper end.

2. The structure of claim 1, in which the liquid reservoir is provided with spaced screens and a filter pad disposed therebetween.

3. The structure of claim 1, in which a screen member is disposed around the lateral discharge ports of the tube member.

4. A combined water filter and purifier comprising a reservoir having an open top, a filter member engaged within the open top and suspended with the reservoir, said filter consisting of a pair of receptacles arranged in nested end to end relation, the bottom of the upper receptacle forming a closure for the lower receptacle, a tube member detachable connecting the receptacles, said tube having a closed lower end and lateral discharge ports thereabove, filter material in the lower receptacle, a screen at the upper end of the lower receptacle for confining the filter material, a conical screen disposed about the lateral discharge ports of said tube member, a liquid receiver suspended within the upper receptacle, the bottom wall of which is spaced inwardly of the lower end and having an outlet, a screen at the lower end of the liquid receiver, a closure for the lower end of said liquid receiver, a screen in said closure adjacent the bottom wall thereof, a filter pad between the screens of said liquid receiver, said closure having an outlet aligned with said tube member, a bottle support carried by the open top of the reservoir, an inverted bottle disposed within said support, a spring-urged valve in said liquid receiver, said valve having a flexible strand normally holding the valve from the outlet and the spring under tension, and said lower filter receptacle having liquid discharge ports adjacent the upper end for passage of liquid into the reservoir.

5. The structure of claim 4, in which the bottle includes an outlet tube adjustably mounted therein.

FRANK SENYAL.